April 17, 1962 A. L. DE JERSEY 3,029,749
MACHINES FOR MAKING SAUSAGE ROLLS AND THE LIKE
Filed Feb. 16, 1960 4 Sheets-Sheet 1

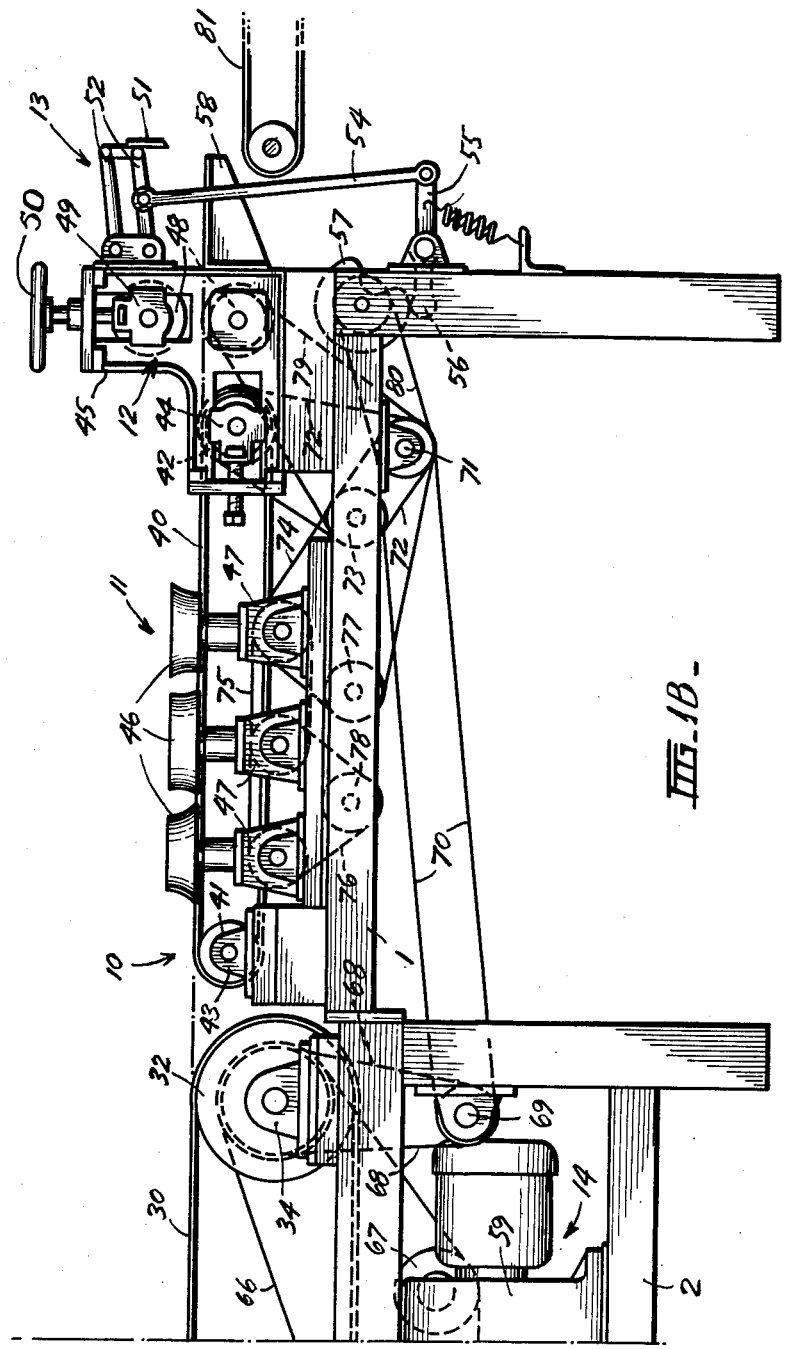

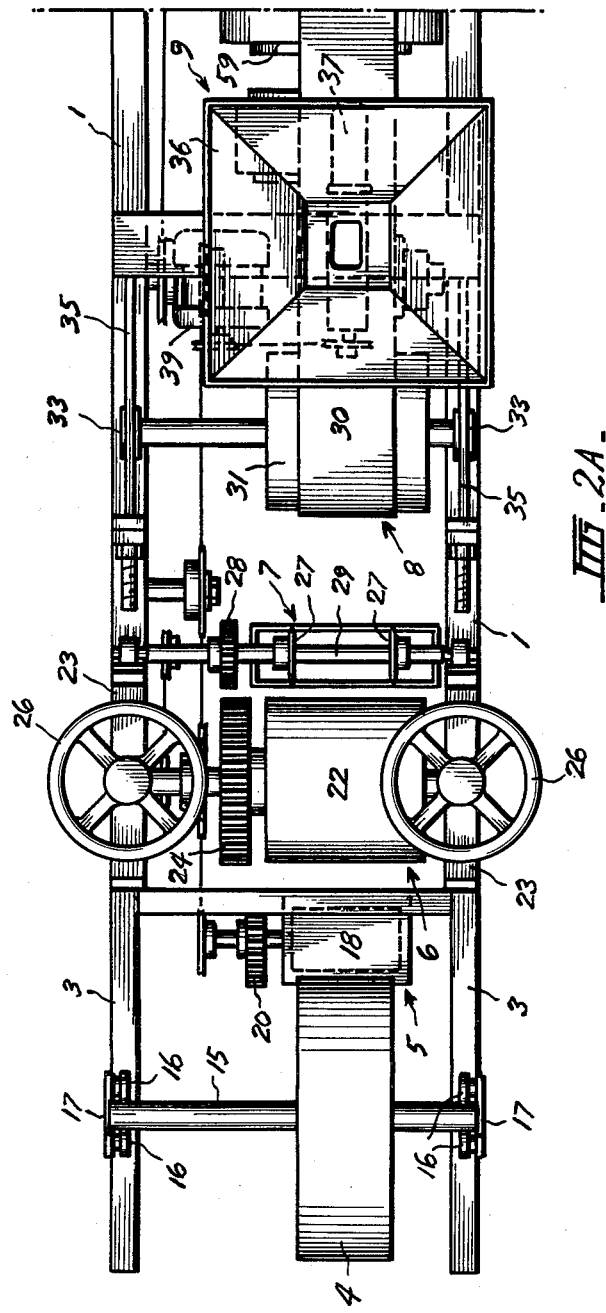

April 17, 1962 A. L. DE JERSEY 3,029,749
MACHINES FOR MAKING SAUSAGE ROLLS AND THE LIKE
Filed Feb. 16, 1960 4 Sheets-Sheet 4

United States Patent Office 3,029,749
Patented Apr. 17, 1962

3,029,749
MACHINES FOR MAKING SAUSAGE ROLLS
AND THE LIKE
Arthur Leslie De Jersey, 20 Scheele St., Surrey Hills,
Victoria, Australia
Filed Feb. 16, 1960, Ser. No. 8,942
9 Claims. (Cl. 107—1)

This invention provides apparatus for continuously making sausage rolls, apple rolls or turnovers, date rolls, fruit rolls and the like, from a web of paste and a suitable meat or fruit or other filling, ready for cooking. Hereinafter, the term "sausage rolls and the like" is used to denote any of the above mentioned kind of product.

Production of sausage rolls on a commercial scale is at present carried out by hand. The procedure adopted is to hand-roll dough paste into a sheet, hand-cut the sheet of paste lengthwise to form a web of paste of suitable width, hand-run a meat or fruit or other suitable filling along the centre of the paste-web, hand-fold the sides of the paste-web so that they overlap and adhere, and hand-sever the filled roll of paste into individual rolls, a suitable material such as egg wash being applied to the paste by hand-brushing after folding of the paste, and immediately prior to cooking, for glazing the paste. This procedure is very limited in rate of production, and is costly as a result, in requiring a relatively large labour force to achieve a substantial output of the product.

The present invention provides apparatus which enables sausage rolls and the like to be made mechanically and continuously, with attendant advantages over the present procedure of manual production.

In accordance with the invention there is provided a machine for making sausage rolls and the like, said machine comprising a conveyor system adapted to receive a web of paste at the feeding end of the conveyor system and carry said paste-web in a substantially horizontal plane to the discharge end of said conveyor system, paste-web feeding means near the feeding end of the conveyor system and adapted to continuously feed the paste-web onto the conveyor system at the feeding end, roll-filling depositing means disposed above and intermediate the length of said conveyor system and adapted to continuously deposit lengthwise and substantially centrally onto the moving paste-web a ribbon of suitable filling for the rolls, paste-web folding means located beyond the roll-filling depositing means and adapted to continuously fold the marginal side sections of the paste-web in overlapping relationship and form a roll of paste encasing the filling, roll-sealing means adapted to apply pressure to the overlapping marginal sections of the filled roll of paste and adhere said overlapping marginal sections together, and roll-severing means adapted to sever the filled roll into individual sausage-rolls and the like.

The arrangement of the conveyor system and paste-web folding means is conveniently such that the marginal side sections of the paste-web overhang the width of the conveyor means at a point beyond the location of the roll-filling depositing means whereby said marginal side sections of the paste-web are free for engagement with the paste-web folding means. A preferred arrangement comprises a primary endless conveyor and a secondary endless conveyor disposed end-to-end in longitudinal line with the feeding end of the secondary conveyor located adjacent the discharge end of the primary conveyor, the width of the primary conveyor being substantially the same as the paste-web and the width of the secondary conveyor being materially narrower than that of the paste-web, said paste-web folding means being disposed at the sides of the secondary conveyor for the purpose specified.

Thus, according to a preferred practical embodiment, the machine of the invention comprises a primary endless conveyor adapted to receive a web of paste at the feeding end and carry said paste-web in a substantially horizontal plane to the discharge end of said primary conveyor, the width of the primary conveyor being substantially the same as the paste-web; paste-web feeding means located near the feeding end of said primary conveyor and adapted to continuously feed the paste-web onto the primary conveyor at the feeding end; roll-filling depositing means disposed above and intermediate the length of said primary conveyor and adapted to continuously deposit lengthwise and substantially centrally onto the moving paste-web a ribbon of suitable filling for the rolls; a secondary endless conveyor disposed end-to-end in longitudinal line with the primary conveyor and with the feeding end of the secondary conveyor located adjacent the discharge end of the primary conveyor and adapted to receive from the primary conveyor the moving paste-web with filling deposited thereon and carry said paste-web past paste-web folding means disposed between the feeding end and the discharge end of said secondary conveyor, the width of the secondary conveyor being materially narrower than that of the paste-web so that the marginal side sections of the paste-web overhang the sides of the secondary conveyor; paste-web folding means located at the sides of the secondary conveyor and between the feeding end and the discharge end of said secondary conveyor as specified and adapted to continuously fold the overhanging marginal side sections of the paste-web in overlapping relationship and form a roll of paste encasing the filling; roll-sealing means located near the discharge end of the secondary conveyor and adapted to apply pressure to the overlapping marginal sections of the filled roll of paste and adhere said overlapping marginal sections together; and roll-severing means located near the discharge end of the secondary conveyor and adapted to sever the filled roll into individual rolls.

The paste-web feeding means preferably consists of a pair of co-acting plain rollers arranged with their axes in the horizontal plane and in vertical alignment, said rollers being geared together for driving so as to feed the paste-web continuously onto the conveyor system at the feeding end and being adjustable for clearance so as also to function as paste-web thickness-regulating means. The roll-filling depositing means preferably consists of a hopper having integral filling extruding mechanism adapted to extrude a continuous ribbon of filling from a nozzle disposed immediately above and substantially centrally of the paste-web when moving lengthwise of the conveyor system. The paste-web folding means preferably consists of oppositely-disposed co-acting rows of shaped rollers arranged with their axes in the vertical plane and located at the sides of the conveyor system. The roll-sealing means preferably consists of a pair of co-acting plain rollers with their axes in the horizontal plane and in vertical alignment, said rollers being suitably driven and being adjustable so as to regulate the degree of paste-sealing pressure applied to the filled roll, which is adapted to be passed between said rollers by the conveyor system, for the purpose. The roll-severing means preferably consists of cutting means comprising an overhead reciprocating cutting-knife arranged to guillotine in timed relationship the filled roll, which is adapted to be directed past the cutting-knife by the conveyor system, for the purpose.

A machine in accordance with the invention preferably also embodies paste-web flour-dusting means, and, paste-web trimming means, respectively adapted to dust the paste-web with flour prior to said paste-web passing between the paste-web feeding rollers, and trim the paste-web to the desired width after passing between said feeding rollers. In the absence of said trimming means, the paste-web is liable to be irregular in width and inconveniently wide due to the squeezing effect that the paste-web feeding rollers has on the paste-web in regulating the paste-web thickness, which in turn affects the folding of the marginal side sections of the paste-web. The paste-web flour-dusting means preferably consists of a pair of co-acting brushes located in a box in advance of the paste-web feeding rollers with the axes of the brushes being in the horizontal plane and in vertical alignment, said brushes being adapted to be driven and contact a flour-flicking bar in the box so as to flick flour onto the paste-web, which is adapted to pass through the box and between said brushes for the purpose. The paste-web trimming means preferably consists of oppositely-disposed pairs of co-acting paste-cutting discs arranged with their axes in the horizontal plane and in vertical alignment and located to trim the sides of the paste-web to a pre-determined width to suit the disposition of the paste-web folding rollers.

The machine of the invention is designed conveniently to be used in conjunction with a spool of pre-formed paste-web. Paste-web in spool form is known, the paste-web being wound onto a spindle for the purpose. In the machine of the invention, the spool of paste-web is rotatably mounted at a suitable position in advance of the feeding end of the conveyor system. Paste-web supporting means such as a roller can be located adjacent the spool of paste-web and in between said spool of paste-web and the flour-dusting means.

In order, however, that the invention may be better understood, reference will now be made to the accompanying drawings, which form part of this specification, and in which:

FIG. 1B is the right-hand side of the front elevational view of the machine partly seen in FIG. 1A.

FIG. 2A is a plan view of the left-hand side of the machine seen in FIG. 1A.

Figure 1A:
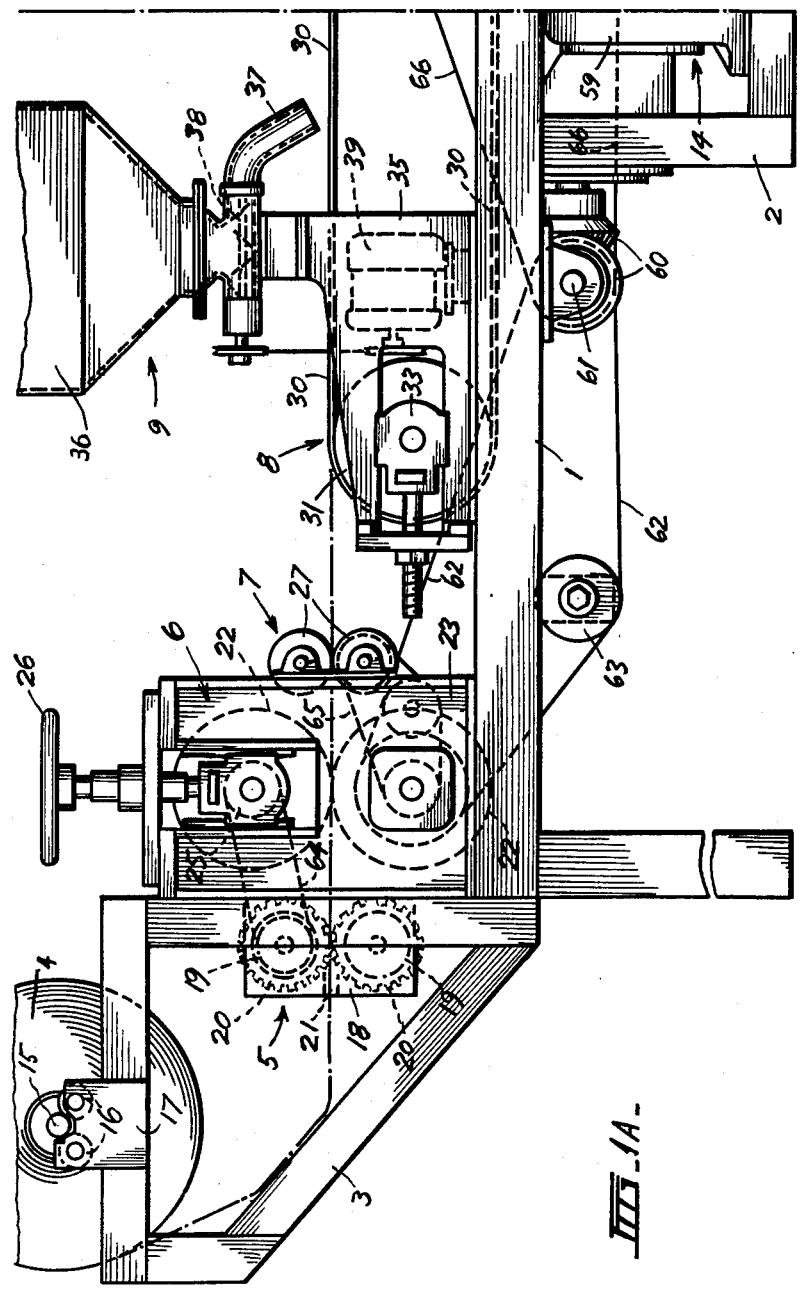
FIG. 1A is a front elevation of the left-hand side of a machine in accordance with the invention.
Figure 2B:
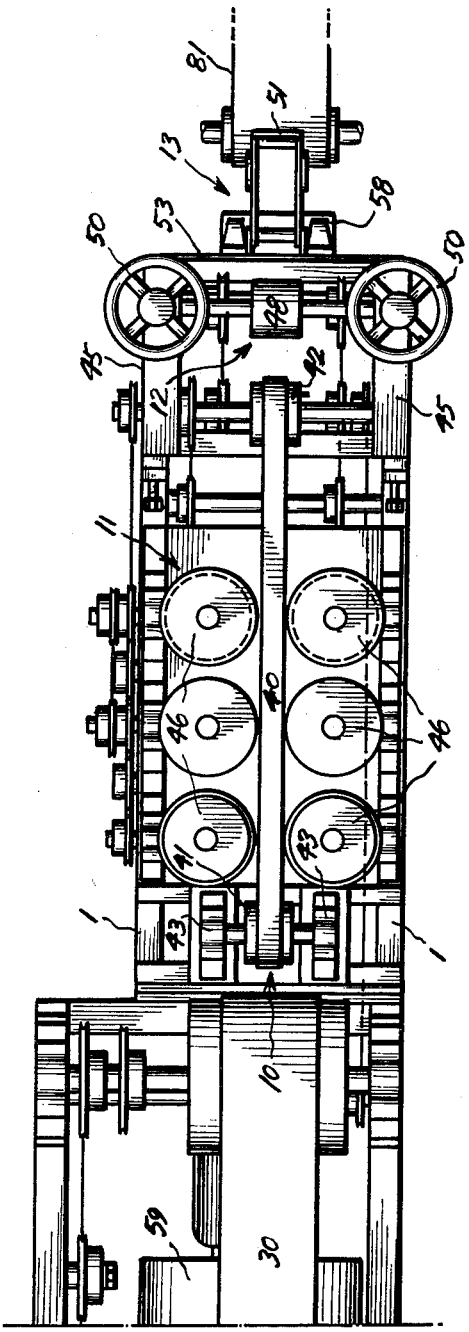
FIG. 2B is a plan view of the right-hand side of the machine partly seen in FIG. 2A.

Referring to the drawings, the machine has a main-frame 1, a sub-frame 2, and an end-frame 3. The end-frame 3 supports the spool of paste-web 4; the main-frame 1 supports the paste-web flour-dusting means 5, the paste-web feeding and thickness-regulating means 6, the paste-web trimming means 7, the primary endless conveyor 8, the roll-filling depositing means 9, the secondary endless conveyor 10, the paste-web folding means 11, the roll-sealing means 12, and the roll-severing means 13; and, the sub-frame 2 supports the main drive means 14.

The spool of paste-web 4 has a spindle 15 which is supported for rotation by rollers 16 in bearings 17 mounted on the end-frame 3. Also mounted on the end-frame 3 is a flour-dusting box 18 enclosing a pair of rotary flour-dusting brushes 19 mounted one above the other and adapted to be rotated contrariwise by driven gears 20 and in a linear direction opposite the travel direction of the paste-web, which is from left to right as shown in the drawings, for the application of wheat-flour or the like to the paste-web. The peripheries of the brushes 19 contact a flour-flicking bar 21 which causes flour on the brushes 19 to be flicked onto the paste-web as it passes between the brushes 19, and together constitute the flour-dusting means 5.

Feeding rollers 22 mounted on the main-frame 1, constitute the paste-web feeding and thickness-regulating means 6, and are adapted to draw the paste-web from the spool 4 and feed the paste-web lengthwise of the machine. The feeding rollers 22 are mounted one above the other in bearings 23 upstanding from the main-frame 1, and are adapted to be rotated contrariwise so as to move the paste-web as indicated. Rollers 22 are rotated by driven gears 24 and have adjustment mountings 25 for varying the clearance between the peripheries of said rollers in known manner, the clearance between the rollers 22 determining the thickness of the paste-web fed to the conveyor system. Adjustment-wheels 26 conveniently provide ready adjustment means for varying the clearance between rollers 22. Thus, the shaft of the upper feeding roller 22 is supported at its ends by the adjustment mountings 25, which slide on the bearings 23 for the purpose, said adjustment mountings 25 being raised or lowered by rotation of handwheels 26, which rotate screw-spindles to which said handwheels are attached, the lower ends of the screw-spindles being connected to said adjustment mountings 25 as indicated in the drawings.

Trimming knives 27, in the form of pairs of knife-edge disc members arranged one above the other and in spaced relationship transversely of the main-frame 1, constitute the paste-web trimming means 7, and correct the width of the paste-web according to a pre-determined width consistent with the width of the primary endless conveyor means 8. The disc-form knives 27 are adapted to be rotated contrariwise by driven gears 28 and in the same linear direction as the travel direction of the paste-web, similar to the direction of rotation of the feeding rollers 22. Knives 27 are adjustable in spaced relationship transversely of the shafts 29 for adjustment of their cutting width.

The primary endless conveyor 8 consists of a canvas or cotton endless conveyor belt 30 arranged so as to have upper and lower substantially horizontal stretches and extending around pulleys 31 and 32 at the feeding and discharge ends respectively of the primary endless conveyor 8, pulley 32 being the driven pulley. Pulleys 31 and 32 are rotatably mounted in bearings 33 and 34, respectively, bearing 34 being mounted directly on the main-frame 1 whilst bearing 33 is mounted for sliding-adjustment in the upstanding side members 35 mounted on the main-frame 1. The width of the conveyor belt 30 is consistent with the width of the paste-web, by reason of the cutting width of the trimming knives 27, as indicated.

Disposed above the primary endless conveyor 8, and intermediate the feeding end and discharge end of said conveyor, is the roll-filling depositing means 9. Said roll-filling depositing means consists of a hopper 36 adapted to contain minced meat or other suitable filling for the rolls and has feeding mechanism for extruding a ribbon of filling from a nozzle 37 disposed immediately above and substantially centrally of the upper face of the paste-web when carried on the primary endless conveyor 8. The filling-feeding mechanism consists of a screw 38 adapted to force a continuous stream of the filling through the nozzle 37, the mechanism being capable of varying the amount of filling delivered from the nozzle at a delivery rate consistent with the travel rate of the paste-web when carried on the primary endless conveyor 8. The hopper 36 and nozzle 37 and screw 38 are supported by the upstanding side members 35, the screw 38 being chain-driven by a variable-speed electric motor 39 housed between the side chambers 35.

Located adjacent the discharge end of the primary endless conveyor 8 is the feeding end of the secondary endless conveyor 10. Said secondary endless conveyor also consists of a canvas or cotton endless conveyor belt 40 arranged so as to have upper and lower substantially horizontal stretches and extending around pulleys 41 and 42 at the feeding and discharge ends respectively of the conveyor 10, pulley 42 being the driven pulley. Pulleys 41 and 42 are rotatably mounted in bearings 43 and 44, respectively, bearing 43 being mounted directly on the main-frame 1 whilst bearing 44 is mounted for sliding adjustment in the upstanding side-members 45 mounted on the main-frame 1 near the discharge end of the secondary conveyor 10.

The width of the secondary endless conveyor belt 40 is materially narrower than the width of the paste-web, so that side marginal sections of the paste-web overhang the sides of said secondary endless conveyor belt 40 for the purpose of engagement with the paste-web folding means 11. Said paste-web folding means consists of oppositely-disposed rows of rollers 46 at the sides of the secondary endless conveyor belt 40 and extending adjacent to and parallel with the side edges of said conveyor belt. The paste-web folding rollers 46 are disposed so that the axis of each is in the vertical plane and the face of each is appropriately curved, the radii of the curved faces progressively changing so that the side marginal sections of the paste-web, in riding against the face of rollers 46, as the paste-web moves past said rollers on the secondary conveyor 10, is progressively tilted upwards for folding and overlapping. Rollers 46 of the paste-web folding means 11 are also mounted in adjustable bearings 47 on the main-frame 1, so as to accommodate varying widths of paste-web and are adapted to be rotated in the same linear direction as the travel direction of the paste-web, said rollers being suitably chain-driven for this purpose. Rollers 46 should have a highly-polished or highly-slippery surface so as to have low-friction engagement with the paste-web and thereby reduce any tendency of the paste-web to adhere to the rollers, or, disintegrate as a result of engagement with the rollers. Said rollers may have a coating of a silicone preparation, sold under the names of "Fluon" or "Teflon," for the purpose.

Near the discharge end of the secondary endless conveyor means 10 are located a pair of pressure-rollers 48, constituting the roll-sealing means 12. Pressure-rollers 48 are mounted one above the other in the side-members 45, the lower roller being adapted to be rotated by chain-drive in the same linear direction as the travel direction of the paste-web, in carrying the filled-roll forward, whilst the upper roller is mounted in an adjustment bearing 49 of known mechanical arrangement, hand-adjustment wheels 50 effecting adjustment of bearing 49 to regulate the pressure applied to the filled-roll. Thus, the shaft of the upper pressure roller 48 is supported at its ends by the adjustment bearings 49, which slide on the side members 45 for the purpose, said adjustment bearings 49 being raised or lowered by rotation of hand-adjusted wheels 50, which rotate screw-spindles to which said hand-adjustment wheels are attached, the lower ends of the screw-spindles being connected to said adjustment bearings 49 as indicated in the drawings.

Located beyond the roll-sealing means 12 is the roll-severing means 13. Said roll-severing means consists of a reciprocating knife or guillotine 51 carried by link-bars 52 pivotally supported by a transverse plate 53 connecting the side-members 45, a connecting-link 54 extending from the link-bars 52 to a spring-loaded lever 55 pivotally supported by the main-frame 1 and co-acting through follower 56 with an operating cam 57 adapted to be rotated by chain-drive. The reciprocating knife or guillotine 51 is adapted to sever the filled-roll projecting from the outer end of the table 58, which also is supported by the main-frame 1. Severed rolls fall onto an endless delivery conveyor 81 adapted to convey the individual rolls to an oven for cooking. Timing in movement of the roll-severing knife 51 can be varied by changing the cam 57 to vary the length of the individual rolls.

Main drive-means 14 for the mechanism comprises a variable-speed electric motor 59 supported by the sub-frame 2. Bevel gears 60 connect the motor 59 to the main drive shaft 61. Drive-chain 62 connects the driven-gears 24 of the feeding rollers 22 with the main drive shaft 61, through idler-pulley 63; drive-chain 64 connects the flour-dusting brushes 19 with the feeding rollers 22; and drive-chain 65 connects the trimming-knives 27 with the feeding rollers 22. Drive-chain 66 connects the primary-conveyor driven-pulley 32 with the main drive shaft 61, through idler-pulley 67; drive-chain 68 connects driven-pulley 32 with a secondary drive shaft 69; drive-chain 70 connects secondary drive shaft 69 with tertiary drive shaft 71; drive-chain 72 connects tertiary drive shaft 71 with driven-pulley 42 of the secondary conveyor 10, through idler-pulley 73; drive-chains 74, 75 and 76 connect the paste-web folding rollers 46 with the tertiary drive shaft 71, through idler-pulleys 77 and 78; drive-chain 79 connects the lower roller of pressure-rollers 48 with tertiary drive shaft 71 through idler-pulley 73; and drive-chain 80 connects the tertiary drive shaft 71 with cam 57 of the roll-severing means 13.

In operation, the electric motor 59 of the main drive means 14 is energized to set in motion the connected mechanism as described, and the outer end of the paste-web from the spool 4 is passed through the flour-dusting box 18 and between the pair of dusting brushes 19 and thence directed to the feeding rollers 22. The outer end of the paste-web is thereby moved past the trimming knives 27 which cut off excess paste at the marginal sides of the paste-web, and then moves onto the feeding end of the primary conveyor belt 30 for travel lengthwise of said conveyor. When the paste-web reaches the nozzle 37 of the roll-filling depositing means 9, the extruding screw 38 of the feeding mechanism is set in operation for laying a ribbon of filling lengthwise centrally of the paste-web passing beneath said nozzle 37, the hopper 36 of the roll-filling depositing means having been charged with minced meat or other suitable filling for the purpose.

The paste-web with the ribbon of filling thereon then passes onto the secondary endless conveyor belt 40 which moves the paste-web past the paste-web folding rollers 46 arranged on both sides of said secondary endless conveyor belt 40. As the paste-web progresses past the paste-web folding rollers 46, the marginal side sections of said paste-web overhanging the sides of said secondary conveyor belt 40 engage with rollers 46 and are thereby tilted upwards and turned over, one marginal side section folding in advance of the other and said marginal side section overlapping progressively. The roll of folded paste-web encasing the filling then leaves the discharge end of conveyor belt 40 and passes between the pressure-rollers 48 to seal the folded sections of the paste-web together, and then moves past the guillotine 51 where it is severed into individual rolls. The individual rolls fall on to endless delivery conveyor 81 for conveyance to a cooking oven. Egg-wash or other suitable material can be applied to the individual rolls, immediately prior to their passing into the cooking oven, so that the cooked rolls have a browned and glossy or glazed appearance on the upper surface.

The embodiments of the invention in which an exclusive property or privilege is claimed are defined as follows:

1. A machine for making sausage rolls comprising a frame having a feeding end and a discharge end and adapted to rotatably support a roll of paste-web at said feeding end; a primary endless conveyor supported by the frame and adapted to receive the paste-web from the roll at the feeding end of said conveyor and carry said paste-web in a substantially horizontal plane to the discharge end of the conveyor, said conveyor having a width substantially the same as that of the paste-web; paste-web feeding means supported by said frame and disposed between the roll of paste-web and the feeding end of said conveyor and adapted to continuously feed the paste-web onto the feeding end of said conveyor; roll-filling depositing means supported by said frame and disposed above and intermediate the length of said conveyor and adapted to continuously deposit lengthwise and substantially centrally onto the moving paste-web a ribbon of filling for the rolls; a secondary endless conveyor supported by said frame and disposed end-to-end in longitudinal line with the primary conveyor, the secondary conveyor having a feeding end located adjacent the discharge end of the primary conveyor and adapted to receive from the primary conveyor the moving paste-web with filling deposited thereon and carry said paste-web, paste-web folding means disposed adjacent the secondary conveyor and between the feeding end and the discharge end thereof, the width of the secondary conveyor being materially narrower than that of the paste-web so that the marginal side sections of the paste-web overhang the sides of the secondary conveyor; said paste-web folding means comprising oppositely-disposed coacting rows of shaped rotary rollers having vertical axes and adapted to continuously fold the overhanging marginal side sections of the paste-web in overlapping relationship to form a roll of paste encasing the filling; roll-sealing means supported by the frame and located near the discharge end of the secondary conveyor and adapted to apply pressure to the overlapping marginal sections of the filled roll of paste and adhere said overlapping marginal sections together; and roll-severing means located near the discharge end of the secondary conveyor and adapted to sever the filled roll into individual rolls.

2. A machine according to claim 1, wherein the paste-web feeding means comprises a pair of co-acting rotary rollers arranged with their axes in a horizontal plane and in vertical alignment, said rollers being geared together and driven to feed the paste-web continuously onto the primary conveyor at the feeding end thereof and being adjustable for clearance to regulate the paste-web thickness.

3. A machine according to claim 1, wherein the roll-filling depositing means comprises a hopper including integral filling-extruding means adapted to extrude a continuous ribbon of filling immediately above and substantially centrally of the paste-web as the paste-web moves lengthwise of the primary conveyor.

4. A machine according to claim 1, wherein the roll-sealing means comprises a pair of co-acting rotary rollers having axes in the horizontal plane and in vertical alignment, said rollers being adapted to be driven and one of said rollers being adjustable to regulate the degree of paste-sealing pressure applied to the filled roll moved between said rollers by the secondary conveyor.

5. A machine according to claim 1, wherein the roll-severing means comprises an overhead reciprocating cutting-knife disposed to guillotine the filled roll in timed relationship as the filled roll is moved past the cutting-knife by the secondary conveyor.

6. A machine for making sausage rolls comprising a frame having a feeding end and a discharge end and adapted to rotatably support a roll of paste web at said feeding end; a primary endless conveyor supported by the frame and adapted to receive the paste-web from the roll at the feeding end of said conveyor and carry said paste-web in a substantially horizontal plane to the discharge end of the conveyor, said conveyor having a width substantially the same as that of the paste-web; paste-web feeding means supported by said frame and disposed between the roll of paste-web and the feeding end of said conveyor and adapted to continuously feed the paste-web onto the feeding end of said conveyor; paste-web trimming means supported by the frame and disposed between the paste-web feeding means and the feeding end of the primary conveyor and adapted to trim the paste-web to a desired width after passing said paste-web feeding means; roll-filling depositing means supported by said frame and disposed above and intermediate the length of said conveyor and adapted to continuously deposit lengthwise and substantially centrally onto the moving paste-web a ribbon of filling for the rolls; a secondary endless conveyor supported by said frame and disposed end-to-end in longitudinal line with the primary conveyor, the secondary conveyor having a feeding end located adjacent the discharge end of the primary conveyor and adapted to receive from the primary conveyor the moving paste-web with filling deposited thereon and carry said paste-web, paste-web folding means adjacent the secondary conveyor and disposed between the feeding end and the discharge end thereof, the width of the secondary conveyor being materially narrower than that of the paste-web so that the marginal side sections of the paste-web overhang the sides of the secondary conveyor; said paste-web folding means comprising oppositely-disposed co-acting rows of shaped rotary rollers having vertical axes and adapted to continuously fold the overhanging marginal side sections of the paste-web in overlapping relationship to form a roll of paste encasing the filling; roll-sealing means supported by the frame and located near the discharge end of the secondary conveyor and adapted to apply pressure to the overlapping marginal sections of the filled roll of paste to adhere said overlapping marginal sections together; and roll-serving means located near the discharge end of the secondary conveyor and adapted to sever the filled roll into individual rolls.

7. A machine according to claim 6, wherein the paste-web feeding means comprises a pair of co-acting rotary rollers having axes in the horizontal plane and in vertical alignment, said rollers being geared together and driven to feed the paste-web continuously onto the primary conveyor at the feeding end and being adjustable for clearance to regulate the paste-web thickness; the roll-filling depositing means comprising a hopper including integral filling-extruding means adapted to extrude a continuous ribbon of filling immediately above and substantially centrally of the paste-web as the paste-web moves lengthwise of the primary conveyor; the roll-sealing means comprising a pair of co-acting rotary rollers having axes in the horizontal plane and in vertical alignment, one of the latter said rollers being adapted to be driven and adjustable to regulate the degree of paste-sealing pressure applied to the filled roll moved between said rollers by the secondary conveyor; the roll-severing means comprising an overhead reciprocating cutting-knife disposed to guillotine the filled roll in timed relationship as the filled roll is moved past the cutting-knife by the secondary conveyor; and the paste-web trimming means comprising oppositely-disposed pairs of co-acting paste-cutting rotary discs disposed with their axes in the horizontal plane and in vertical alignment and located to trim the sides of the paste-web to a pre-determined width to correspond to the disposition of the paste-web folding means.

8. A machine for making sausage rolls comprising a frame having a feeding end and a discharge end and adapted to rotatably support a roll of paste-web at said feeding end; a primary endless conveyor supported by the frame and adapted to receive the paste-web from the roll at the feeding end of said conveyor and carry said paste-web in a substantially horizontal plane to the discharge end of the conveyor, said conveyor having a width substantially the same as that of the paste-web; paste-web feeding means supported by said frame and disposed between the roll of paste-web and the feeding end of said conveyor and adapted to continuously feed the paste-web onto the feeding end of said conveyor; paste-web flour-dusting means supported by the frame and adapted to dust the paste-web with wheat-flour prior to passage of the paste-web past the paste-web feeding means; paste-web trimming means supported by the frame and disposed between the paste-web feeding means and the feeding end of the primary conveyor and adapted to trim the paste-web to a desired width after passing said paste-web feeding means; roll-filling depositing means supported by said frame and disposed above and intermediate the length of said conveyor and adapted to continuously deposit lengthwise and substantially centrally onto the moving paste-web a ribbon of filling for the rolls; a secondary endless conveyor supported by said frame and disposed end-to-end in longitudinal line with the primary conveyor, the secondary conveyor having a feeding end located adjacent the discharge end of the primary conveyor and adapted to receive from the primary conveyor the moving paste-web with filling deposited thereon and carry said paste-web, paste-web folding means adjacent the secondary conveyor and disposed between the feeding end and the discharge end thereof, the width of the secondary conveyor being materially narrower than that of the paste-web so that the marginal side sections of the paste-web overhang the sides of the secondary conveyor; said paste-web folding means being supported by the frame and consisting of oppositely-disposed coacting rows of shaped rotary rollers having vertical axes and adapted to continuously fold the overhanging marginal side sections of the paste-web in overlapping relationship and form a roll of paste encasing the filling; roll-sealing means supported by the frame and located near the discharge end of the secondary conveyor and adapted to apply pressure to the overlapping marginal sections of the filled roll of paste and adhere said overlapping marginal sections together; and roll-severing means located near the discharge end of the secondary conveyor and adapted to sever the filled roll into individual rolls.

9. A machine according to claim 8, wherein the paste-web feeding means comprises a pair of co-acting rotary rollers having axes in the horizontal plane and in vertical alignment, said rollers being geared together and driven to feed the paste-web continuously onto the primary conveyor at the feeding end and being adjustable for clearance to regulate the paste-web thickness; the roll-filling depositing means comprising a hopper including integral filling-extruding means adapted to extrude a continuous ribbon of filling immediately above and substantially centrally of the paste-web as the paste-web moves lengthwise of the primary conveyor; the roll-sealing means comprising a pair of co-acting rotary rollers having axes in the horizontal plane and in vertical alignment, said rollers being adapted to be driven and adjustable to regulate the degree of paste-sealing pressure applied to the filled roll moved between said rollers by the secondary system; the roll-severing means comprising an overhead reciprocating cutting-knife disposed to guillotine the filled roll in timed relationship as the filled roll is moved past the cutting-knife by the secondary conveyor; the paste-web trimming means comprising oppositely-disposed pairs of co-acting paste-cutting rotary discs disposed with their axes in the horizontal plane and in vertical alignment and located to trim the sides of the paste-web to a pre-determined width to correspond to the disposition of the paste-web folding means; and the paste-web flour-dusting means comprising a pair of co-acting rotary brushes located between the roll of paste-web and the paste-web feeding means and on opposite sides of said paste-web, the brushes having axes in the horizontal plane and in vertical alignment, a flour-flicking bar, said brushes being adapted to be driven to contact said flour-flicking bar thereby to dust flour onto the paste-web.

References Cited in the file of this patent

UNITED STATES PATENTS

| | | |
|---|---|---|
| 587,828 | Hudson | Aug. 10, 1897 |
| 1,643,143 | Wilcox | Sept. 20, 1927 |
| 2,207,795 | Grimm | July 16, 1940 |
| 2,255,282 | Duffy et al. | Sept. 9, 1941 |
| 2,437,202 | Marino | Mar. 2, 1948 |
| 2,759,433 | Szadziewicz et al. | Aug. 21, 1956 |
| 2,764,106 | Maickel | Sept. 25, 1956 |
| 2,905,105 | Lombi | Sept. 22, 1959 |
| 2,960,045 | Pentzlin | Nov. 15, 1960 |

FOREIGN PATENTS

| | | |
|---|---|---|
| 641,676 | Great Britain | Aug. 16, 1950 |